CABINETRY FOR ELECTRONIC REPRODUCERS

Filed Nov. 25, 1950 5 Sheets-Sheet 1

INVENTORS
LESLIE E. SEPTER
WILLIAM H. MYERS
BY Alden D. Redfield
Charles M. Logan
ATTORNEYS.

CABINETRY FOR ELECTRONIC REPRODUCERS

Filed Nov. 25, 1950 5 Sheets-Sheet 2

INVENTORS
LESLIE E. SEPTER
WILLIAM H. MYERS
BY Alden D. Redfield
Charles M. Hogan
ATTORNEYS CABINETRY FOR ELECTRONIC REPRODUCERS
Filed Nov. 25, 1950 5 Sheets-Sheet 3
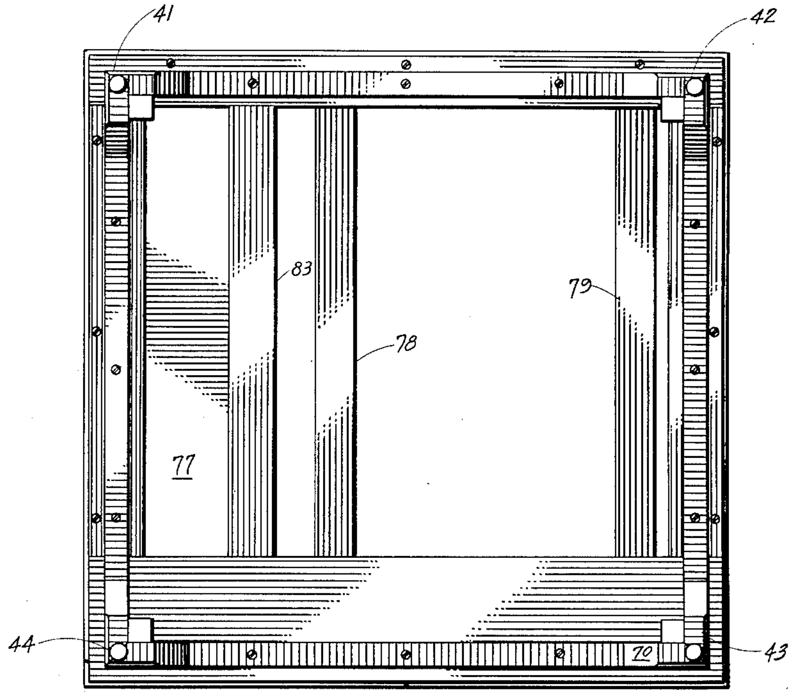
Fig. 5
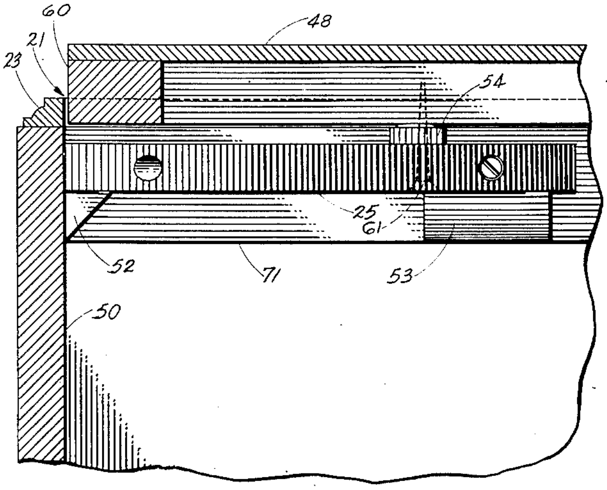
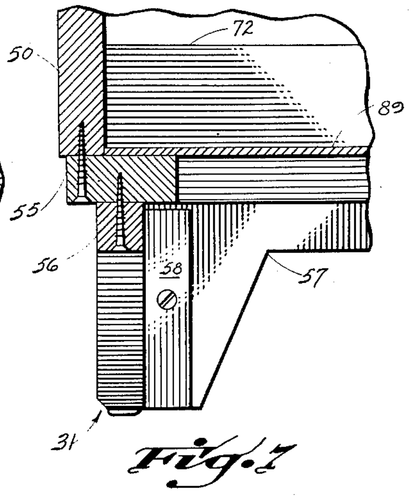
Fig. 7
Fig. 6
INVENTORS
LESLIE E. SEPTER
WILLIAM H. MYERS
BY Alden D. Redfield
Charles M. Hagan
ATTORNEYS

CABINETRY FOR ELECTRONIC REPRODUCERS

Filed Nov. 25, 1950 5 Sheets-Sheet 4

INVENTORS
LESLIE E. SEPTER
WILLIAM H. MYERS

BY Alden D. Redfield
Charles M. Hogan
ATTORNEYS

CABINETRY FOR ELECTRONIC REPRODUCERS

Filed Nov. 25, 1950 5 Sheets-Sheet 5

INVENTORS
LESLIE E. SEPTER
WILLIAM H. MYERS
BY Alden D. Redfield
Charles M. Hogan
ATTORNEYS Patented Nov. 18, 1952

2,618,526

UNITED STATES PATENT OFFICE 2,618,526

CABINETRY FOR ELECTRONIC REPRODUCERS

Leslie E. Septer, Cheviot, and William H. Myers, Cincinnati, Ohio, assignors to Avco Manufacturing Corporation, Cincinnati, Ohio, a corporation of Delaware Application November 25, 1950, Serial No. 197,588

2 Claims. (Cl. 312—7)

The present invention relates generally to furniture sets and specifically to a novel television receiver cabinet, radio receiver-phonograph cabinet, and base cabinet ensemble. The invention contemplates a novel joint structure for the components of such a set, which joint structure is the key to the formation of an interesting variety of permutations and arrangements of said components.

The prior art embraces a type of combination set in which a radio receiver, a phonograph, a television receiver, and one or more record disc storage compartments are housed within a single massive cabinet. Combination sets of that type must necessarily be expensive and bulky. That type of set also suffers from a serious limitation in that the radio receiver and the television receiver cannot be operated for the reception of distinct programs at the same time. Such omnibus sets are frequently too large to fit conveniently, decoratively, and harmoniously within the ordinary living room. The aggregate effect of these limitations and disadvantages has substantially restricted the sale of television receivers of this type to the high priced market.

The primary object of the present invention is to provide a novel cabinet structure which permits the avoidance of the above-mentioned limitations which have heretofore characterized the marketing of combination sets of the type comprising a radio receiver, a phonograph, and a television receiver. One of the objects of the invention is to provide a novel cabinet nesting structure which is featured in the following arrangements: first, a radio receiver-phonograph cabinet which performs an additional function as an end table; second, a record storage-base cabinet which also serves as an end table; third, complementary externally identical end tables severally comprising a radio receiver-phonograph cabinet and a record storage-base cabinet; fourth, a vertical nesting combination of radio receiver-phonograph cabinet and record storage-base cabinet; fifth, a vertical nesting combination of television receiver cabinet, radio receiver-phonograph cabinet, and record storage-base cabinet, comprising a complete console combination set; sixth, a vertical nesting combination of television receiver cabinet and radio receiver-phonograph cabinet, comprising a complete console combination set of lesser height than the fifth-mentioned combination; and seventh, a vertical combination of television receiver cabinet nesting within a portion of the base cabinet, comprising a consolette set.

Another object of the invention is to provide a phonograph storage or base or radio-phonograph cabinet including a top cover and a support for the cover, said top cover being removable and said support being so formed as to engage and position the complementary bottom portion of a similar cabinet, which portion nests within said support. An ancillary object is to provide a support of sufficient versatility to engage and position a table model television receiver, if desired.

Other objects of the invention are to provide a phonograph storage or base or radio-phonograph cabinet construction including such a removable top cover construction as well as legs so formed as to engage and nest within the complementary supporting structure of a similar cabinet. A specific object under this heading is to provide a cabinet construction which is also of utility as an end table.

The advantages of the construction in fulfillment of the objects of the invention are:

First, flexibility—in that the three principal pieces of furniture afford a large variety of decorative arrangements, including separate use and the seven dispositions mentioned above;

Second, uniformity—in that the base and radio phonograph cabinets are identical;

Third, double utility—in that the base and radio-phonograph cabinets simulate end tables in appearance;

Fourth, economy—in that the owner may acquire the separate units simultaneously or successively to fit his requirements and circumstances;

Fifth, compactness and minimum floor space consumption—in that the cumulation of the cabinets by the use of the above-mentioned nesting feature is vertical, not horizontal;

Sixth, portability and ease in handling—in that each of the units may separately and easily be moved about the room at the consumer's convenience;

Seventh, simultaneous utility—in that the television unit may easily be removed and used in one location while the radio receiver-phonograph unit can be operated in another place.

This construction is incorporated in commercial sets made and sold under applicants' assignee's nationally known trade-mark "Crosley."

For a better understanding of the present invention, together with other and further objects, advantages, and capabilities thereof, reference is made to the following description of the accompanying drawings, in which there is illustrated a preferred illustrative ensemble in accordance with the invention.

In the accompanying drawings:

Fig. 3 is a top view of the Fig. 1 record storage cabinet as it appears with the top cover removed;

Figure 1:
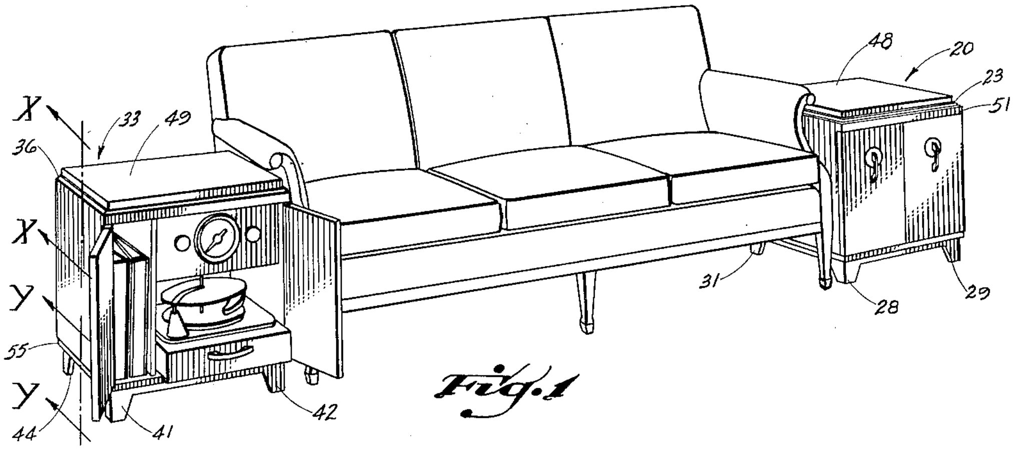
Fig. 1 is a front perspective view of a pair of end tables in accordance with the invention, in conventional disposition relative to a couch, one of said end tables comprising a radio receiver-phonograph cabinet and the other of said end tables comprising a record storage cabinet.
Figures 8, 9, 10:
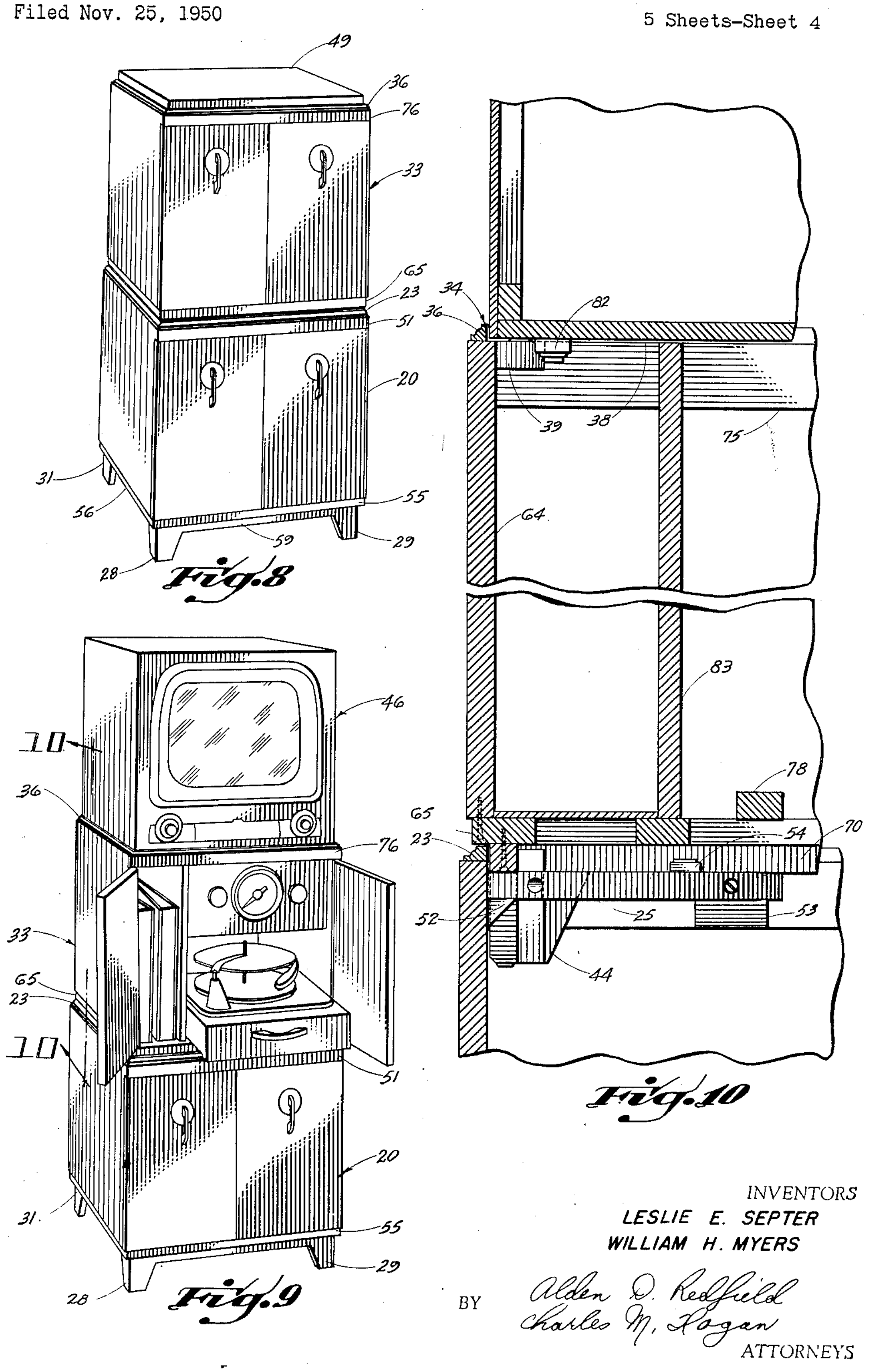
Figure 11:
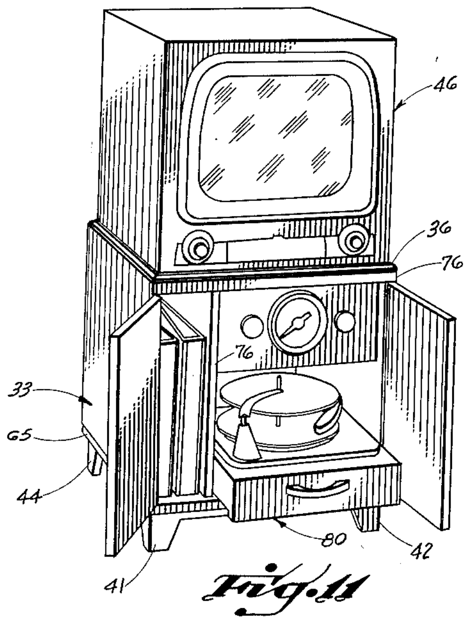
Figure 12:
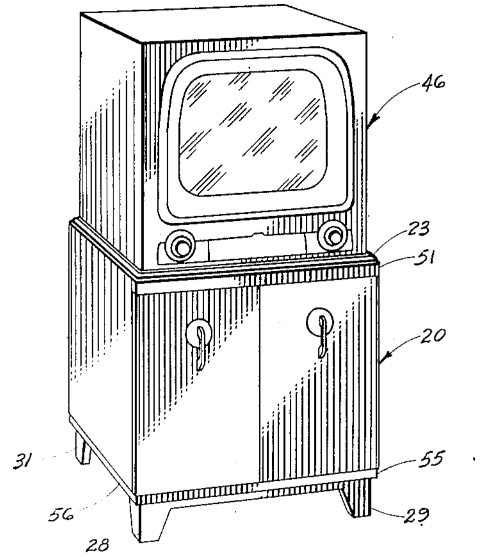

Figs. 6 and 7 are fragmentary elevational sectional views of the base cabinet taken along lines (not shown) corresponding to the lines X—X and Y—Y, respectively, of the radio receiver-phonograph cabinet in Fig. 1, looking in the direction of the arrows. For convenience the section lines X—X and Y—Y are located in Fig. 1 on the radio unit. However, Figs. 6 and 7 relate to the record storage or base unit when viewed as suggested by lines X—X and Y—Y;

Fig. 8 is a front perspective view of a radio receiver-phonograph consolette in accordance with the invention;

Fig. 9 is a perspective view of a complete television receiver-radio receiver-phonograph console in accordance with the invention;

Fig. 10 is a fragmentary elevational sectional view taken along the line 10—10 of Fig. 9;

Fig. 11 is a front perspective view of a television receiver-radio receiver phonograph console in accordance with the invention, the record storage base being omitted; and Fig. 12 is a front perspective view of a television receiver-consolette in accordance with the invention.

In accordance with the invention there is provided a furniture combination comprising: First, a rectangular parallelepiped-shaped record storage or base cabinet 20 having a rim 21 at the top thereof, said rim having a closed configuration defining a rectangular aperture 22 and being formed with an exterior decorative apron 23, four ledge member 24, 25, 26, and 27 secured to the storage cabinet across the top corners of the aperture to provide a support, and four mounting legs (including 28, 29, and 31) projecting downwardly from the bottom corners of said cabinet; second, a rectangular parallelepiped-shaped radio receiver and phonograph cabinet 33 having a rim 34 at the top thereof, said rim having a closed configuration defining a rectangular aperture 35 and being formed with an exterior decorative apron 36, a ledge (37, 38, 39, 40) secured to the receiver-phonograph cabinet within the last-named aperture 35 to provide a second support, said radio receiver-phonograph cabinet resting on said four ledge members 24, 25, etc., and having four mounting legs 41, 42, 43, 44 projecting into the first named aperture 22; and third, a rectangular parallelepiped-shaped television receiver cabinet 46 resting on the last-named support (37, 38, 39, 40) with its bottom margin nesting within the last-named rim 34, all of said cabinets forming a unitary vertically registered ensemble (shown in Fig. 9).

Also in accordance with the invention there are provided individual removable top panels 48 and 49 having shapes complementary to said rims 21 and 34, respectively, said base and radio receiver cabinets being optionally separately utilized with both top panels in place (as in Fig. 1), or as a unitary vertically registered ensemble with the radio receiver-phonograph cabinet resting on the first-named support (24, 25, 26, and 27) in lieu of a top panel (as shown in Fig. 8). The invention further provides an arrangement whereby the television receiver cabinet may rest on the support (37, 38, 39, 40) at the top of the radio receiver-phonograph cabinet, with the bottom margin of the television receiver nesting within the rim 34, the television receiver cabinet and the radio receiver-phonograph cabinet then forming a unitary vertically registered ensemble (Fig. 11). Another optional arrangement contemplates the nesting of the television receiver within the rim 21 of the record storage base cabinet 20 (as shown in Fig. 12).

Referring now specifically to Figs. 2, 3, 6, and 7, there are shown in these figures the structural details of the record storage or base cabinet 20. That cabinet comprises side panels and rear strips and is provided with suitably hinged front doors. The rear strips are shown at 71 and 72 in Figs. 6 and 7. The left side panel 50 is shown in section in Fig. 6. The main body of the cabinet is completed by a strip 51 (Fig. 1) disposed above and in the plane of the front doors when they are in closed position. Superimposed on the top edges of the side panels and the strips 51 and 71 is a molding arranged in a closed rectangular configuration. This molding defines an inner quadrangular rim 21 and is formed with an outer decorative apron 23. Supporting ledges 24, 25, 26, and 27 are placed across the corners of the rectangular aperture 22 defined by the rim 21, and these ledges are supported on mounting blocks 52 and 53, these being shown in detail in Fig. 6. The top plane of the support provided by the ledge members 24, 25, 26, and 27 is slightly below the level of the top edge of side panel 50. The supporting blocks 52 and 53 are preferably glued in place in abutment with the side panel and upper rear strip, respectively, and the ledge members such as 25 are secured to the side panel and upper rear strip as by screws illustrated in Fig. 6. A pad 54 of soft material is secured to the top of the support 25 for a reason hereinafter fully explained. The constructions of each of the support members 24, 25, 26, and 27 are substantially identical, and there is no need for further description of the members 24, 26, and 27.

Referring now to the details of the bottom construction of the base cabinet 20, they are shown in Fig. 7. A strip 55, formed as a closed quadrangle, is disposed below and in abutment with the bottom edges of the side panels and the lower rear strip 72. The strip 55 is disposed slightly inwardly from the panels of the cabinet to define a reduced section. Disposed immediately below the strip 55 are four mounting and supporting strips such as those designated by the reference numerals 56, 57, and 59. These mounting strips are suitably joined to form a quadrangular supporting frame, the corners of which project downwardly to form the four mounting legs such as 28, 31, and 29, leg 31 being shown in detail in Fig. 7. Reinforcing blocks such as that shown at 58

(Fig. 7) are disposed inwardly of the mounting leg corners and secured thereto as by screws. The strips 56 and 57 and the other two members of the mounting frame secured to the strip 55 as by screws, and this strip 55 is secured to the side and rear panels as by the screws shown.

Figure 2:
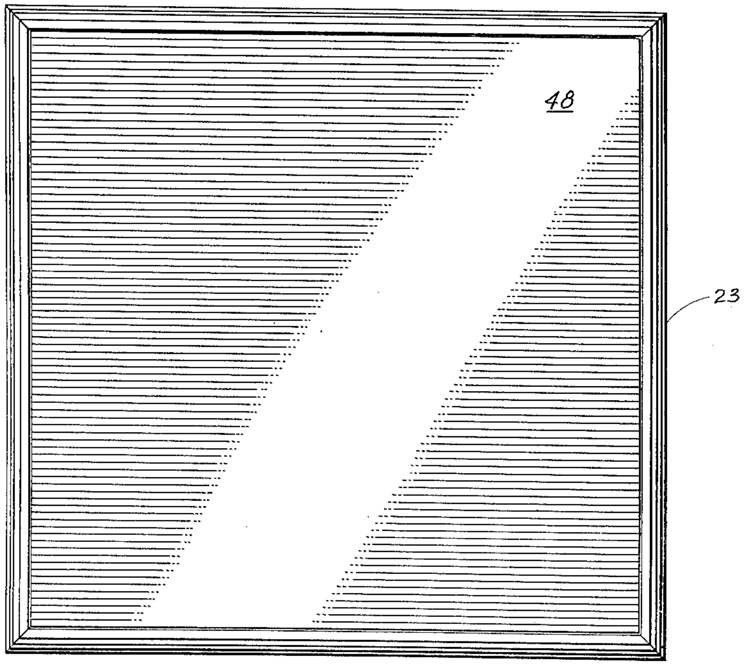
Fig. 2 is a top view of the record storage cabinet illustrated in Fig. 1, with the removable top cover in place.

The bottom of the base cabinet is closed by a suitable bottom panel 89. It will be understood that upper and lower strips 71 and 72 are provided at the rear in lieu of a complete wooden panel so that the space between those strips may be closed by a sheet of insulating material disposed between said top and bottom strips in conventional fashion. Referring again to Fig. 6, the base cabinet 20, when used alone as an end table or otherwise, is closed by a top panel 48 secured to a rectangular frame 60, which frame is complementary to and nests within the rim 21, as best shown in Fig. 2. The quadrangular frame 60 rests on the four supporting pads (54, Fig. 6) and may optionally be permanently secured in place as by screws 61 (Fig. 6) driven through the ledge members 24, 25, 26, and 27.

The interior of the base member may be arranged in any suitable manner, and it is preferably employed as a record storage cabinet. It has further utility as an end table or as a support for a television receiver 46 or as a support for a radio phonograph cabinet 33.

Figure 5:
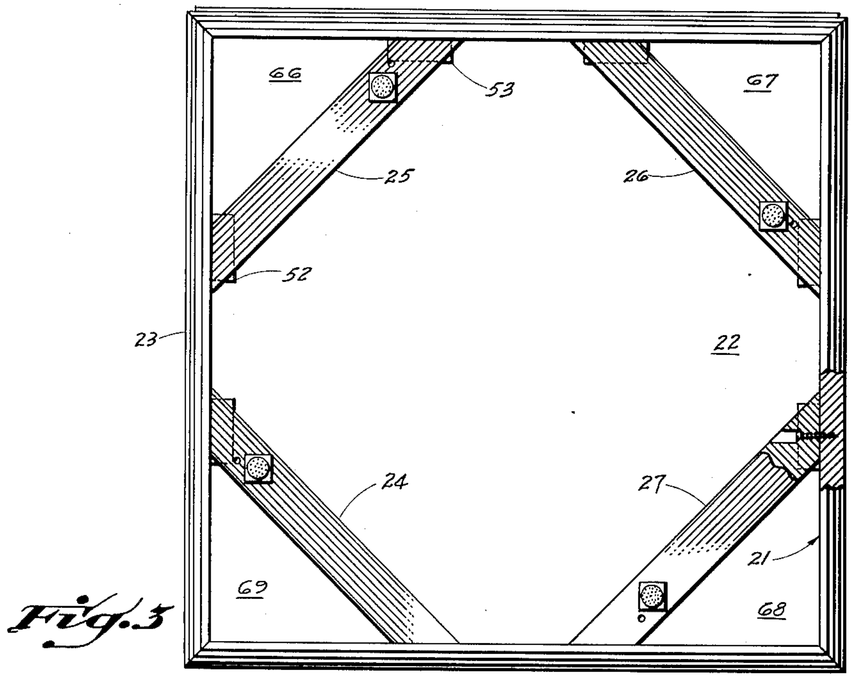
Fig. 5 is a bottom view of the Fig. 1 radio receiver-phonograph cabinet.

The description now proceeds to the radio phonograph cabinet illustrated in detail in Figs. 5 and 10. This cabinet comprises the usual side and rear panels, side panel 64 being shown in detail in Fig. 10. The bottom construction of cabinet 33 is substantially identical to that of cabinet 20, a quadrangular four-piece strip 65 being screwed to the bottom edges of the side panels, and a quadrangular supporting frame, the corners of which are projected downwardly to form mounting legs such as 41, 42, 43, and 44, being screwed onto strip 65. Leg 44 is shown in detail in Fig. 10. When the unit 33 is mounted on top of and in vertical registry with the unit 20, the leg 44 fits within the triangular aperture 66 between support member 25 and the adjacent corner of rim 21. The remaining mounting legs of the unit 33 similarly fit within the apertures 67, 68, and 69, the bottom quadrangular frame resting on the ledge members 24, 25, 26, and 27. For example, the rear member 70 (corresponding to element 57 of unit 20) of the rectangular bottom frame of the radio phonograph cabinet unit bears on the ledge members 25 and 26. The shape of the quadrangular frame formed by the member 70 and the three other frame members is such that it nests within the rim 21 and is complementary thereto. Thus it will be seen that the base cabinet 20 may be used with its top panel 48 in place. Alternately, the top panel may be removed and a unit 33 placed on top of and in vertical registry with the unit 20, in which case strip 65 lies immediately above rim 21. A third arrangement, illustrated in Fig. 12, is also available, the television receiver unit 46 being mounted with its bottom margin nesting within rim 21, the television receiver unit then bearing on the ledges 24, 25, 26, and 27.

Figure 4:
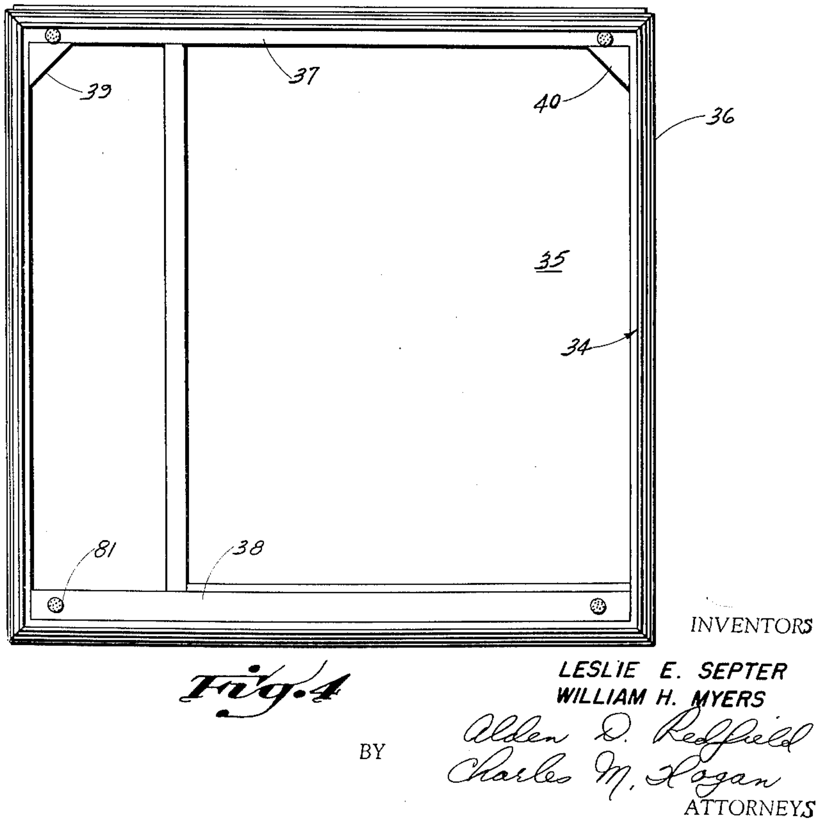
Fig. 4 is a top view of the Fig. 1 radio receiver-phonograph cabinet as it appears with the top cover removed.

As best seen in Figs. 10 and 4, the top of the unit 33 is very similar to the top of unit 20. A rectangular supporting ledge 37, 38 for a panel 49, or, alternately, a television unit 46, is provided by the inner margins of the top edges of the side panels (such as 64) and the rear strip 75 and the front strip 76. The top surfaces of corner blocks 39 and 40 (Figs. 10 and 4) lie flush with the top surfaces of the ledge to reinforce the ledge. A vertical divider 83 separates the record storage compartment 77 from the phonograph compartment. Rails 78 and 79 provide support for the sliding phonograph unit 80.

Superimposed on the top edges of the front and rear strips 76 and 75 and the side panels is a molding arranged in a closed rectangular formation. This molding defines an inner quadrangular rim 34 and is formed with an outer decorative apron 36.

The ledge 37, 38, 39, 40 is provided with resilient pads 81 (Fig. 4). The radio cabinet may be used with the top panel 49 (similar to 48) in place. Alternately the top panel may be removed and a unit 46 placed on top of and in vertical registry with the unit 33, in which case the lower margin of unit 46 nests snugly within rim 34, the unit 46 resting on the ledge 37, 38, 39, 40, the mounting legs (such as 82) of the television receiver unit being inboard of the corners of unit 33.

The construction of unit 46 is otherwise conventional. Wood exterior paneling and structural members are preferably employed in all of the units 20, 33, and 46.

Each of the units 20, 33, and 46 can be individually acquired. The three units add up to a combination which brings the whole field of broadcast, telecast, and recorded entertainment into the home, in matched furniture offering a variety of arrangements. When the radio and base units are placed on either side of a divan (Fig. 1) to serve as matching end tables, the radio unit is conveniently located for chairside operation, and the television unit can be placed on a bookshelf, table, or another matching base unit. The radio and base units together (Fig. 8) form a radio-phonograph console complete with record storage space. When the consumer is ready for television, the television unit 46 can be added in the matching combination (Fig. 9). Optionally, the television unit 46 fits on the radio-phonograph unit (Fig. 11) or the base unit (Fig. 12), in each case nesting snugly within top molding and giving the appearance of a solid single piece of furniture.

While there has been shown and described what is at present considered the preferred embodiment of the present invention, it will be obvious to those skilled in the art that various modifications and substitutions of equivalents may be made therein without departing from the true scope of the invention as defined by the appended claims.

We claim:

1. A furniture combination comprising: First, a rectangular parallelepiped-shaped independent record storage cabinet having two vertical doors forming its front and having a rim at the top thereof, said rim having a closed configuration defining a rectangular aperture and being formed with an exterior decorative apron, four ledge members secured to the storage cabinet across the top corners of the aperture to provide a support, and four mounting legs projecting downwardly from the bottom corners of said cabinet; second, a rectangular parallelepiped-shaped independent radio receiver and phonograph cabinet having two vertical doors forming its front and having a rim at the top thereof, said rim having a closed configuration defining a rectangular aperture and being formed with an exterior decorative apron, a ledge secured to the receiver-phonograph cabinet within the last-named aperture to provide a second support, said radio receiver-phonograph cabinet resting on said four ledge members and having four mounting legs projecting into the first-named aperture, both of said cabinets having a like external appearance and separate utility as end tables; and third, a rectangular parallelepiped-shaped television receiver cabinet resting on the last-named support with its bottom margin nesting within the last-named rim, all of said cabinets forming a unitary vertically registered ensemble.

2. A furniture combination comprising: First, an independent record storage cabinet having two vertical doors forming its front and having a rim at the top thereof, said rim having a closed configuration defining an aperture and means secured to the storage cabinet to provide a support, mounting legs projecting downwardly from the bottom corners of said cabinet; second, an independent radio receiver and phonograph cabinet having two vertical doors forming its front and having a rim at the top thereof, said rim having a closed configuration defining an aperture, means secured to the receiver-phonograph cabinet to provide a second support, said radio receiver-phonograph cabinet resting on the first-named support and having mounting legs projecting into the first-named aperture, both of said cabinets having a like external appearance and separate utility as end tables; and third, an independent television receiver cabinet resting on the last-named support with its bottom margin nesting within the last-named rim, all of said cabinets forming a unitary vertically registered ensemble.

LESLIE E. SEPTER.
WILLIAM H. MYERS.

REFERENCES CITED

The following references are of record in the file of this patent:

UNITED STATES PATENTS

| Number | Name | Date |
|---|---|---|
| 659,851 | Knobel | Oct. 16, 1900 |
| 1,244,944 | Beecroft | Oct. 30, 1917 |
| 1,756,984 | Mason | May 6, 1930 |
| 1,857,640 | Johnson | May 10, 1932 |

FOREIGN PATENTS

| Number | Country | Date |
|---|---|---|
| 227,222 | Great Britain | Jan. 15, 1925 |